United States Patent [19]

Zieke

[11] Patent Number: 4,522,678
[45] Date of Patent: Jun. 11, 1985

[54] TRANSVERSELY ADJUSTABLE PROFILE DIE BLOCK

[75] Inventor: Larry M. Zieke, Midland, Mich.

[73] Assignee: The Dow Chemical Company, Midland, Mich.

[21] Appl. No.: 435,849

[22] Filed: Oct. 21, 1982

[51] Int. Cl.$^3$ .................... B29B 7/14; B29C 19/00; B29D 3/00; B29G 2/00

[52] U.S. Cl. .................. 156/501; 156/244.11; 425/114; 425/466

[58] Field of Search ............ 156/500, 501, 244.11, 156/244.25, 244.22; 425/466, 381, 113, 114, 133.5, DIG. 244, DIG. 243; 264/176 R

[56] References Cited

U.S. PATENT DOCUMENTS

| | | | |
|---|---|---|---|
| 2,720,679 | 10/1955 | Ratliff | 425/466 |
| 3,877,857 | 4/1975 | Melead | 425/381 |
| 4,295,919 | 10/1981 | Sutrina et al. | 156/500 |
| 4,302,172 | 11/1981 | Hogseth et al. | 425/466 |
| 4,372,739 | 2/1983 | Vetter | 425/466 |

Primary Examiner—Edward Kimlin
Assistant Examiner—Louis Falasco
Attorney, Agent, or Firm—L. E. Hessenaur, Jr.

[57] ABSTRACT

In the manufacture of film containing integral fasteners and the like, the film commonly exits through an elongated slot die while profiles for the fasteners exit through a smaller configured slot located laterally along the film die slot. The fastener profiles normally carry a thickened base so that the profiles will stand without undue tipping for better interengagement with one another. It has been found that it is advantageous if the base of the profile can be adjusted transversely of the film slot so that the size of the base can be adjusted on-line. The present invention allows the die block to be transversely adjustable by a combination of a U-shaped mounting block, an inverted T-shaped profile plate and an eccentric adjustment pin, assembled in a fashion so that the eccentric pin can be rotated to adjust transversely the gap through which the profile base passes just before joining the film. This device also makes possible measurement of the gap for the profile base indirectly on line.

3 Claims, 8 Drawing Figures

TRANSVERSELY ADJUSTABLE PROFILE DIE BLOCK

BACKGROUND OF THE INVENTION

This invention relates to apparatus for the in-line forming of integral thermoplastic fasteners with thermoplastic film or sheet stock to made into bags, other containers, or other items which are closable or joinable by the fasteners. One way of forming such film or sheet with integral fasteners is that shown in U.S. Pat. No. 4,295,919, assigned to the same assignee as is the present invention. In the embodiments shown in that patent, the film or sheet is extruded through an elongated slot die. The fasteners are separately extruded through a profile die block attached to the side of the die and laterally adjustable along the side of the die so that the fastener profiles can be extruded onto the hot film as it leaves the slot die, the profiles and film body thereby being joined. In such an arrangement, there is no transverse adjustability between the profile die block and the film die and, therefore, the base of the profile which joins the profile to the film is fixed in size and shape unless extrusion is stopped and hardware changes made. Thus, any transverse adjustment in the apparatus of the prior art to change the profile base requires a shutdown of the apparatus. Since the size and shape of the profile base can dramatically affect the operability of the fastener elements, the lack of being able to affect their change during forming has been a shortcoming in the prior art process as respects both operating efficiencies and fastener quality. There, thus, has been a need to have a profile die block which is adjustable in the transverse direction so that the base of the profile is readily adjustable on-line. The present invention makes such on-line transverse adjustability possible.

SUMMARY OF THE INVENTION

This invention involves a profile die block to be attached to a film or sheeting die and which is adjustable in the transverse direction with respect to the extrusion slot of the film or sheeting die. The main function of the invention is the mounting, positioning and delivery of polymer to a fastener profile plate that is used to deliver an extruded fastener element to a cast film or sheet as the latter is being extruded. The profile plate is positioned in the adjustable profile die block and then mounted on the side of the film or sheet die adjacent the film or sheet extrusion slot. The adjustable profile die block consists of three components; a generally U-shaped mounting block, a generally inverted T-shaped profile plate holder, and an eccentric adjustment pin. They are fitted together such that when the mounting block is affixed to the film or sheet die, the inverted T-shaped profile plate holder fits snugly into a rectangular opening of the mounting block and the eccentric adjustment pin fits in a hole in the mounting block and a groove-like slot in the inverted T-shaped holder. An offset portion of the eccentric pin is located in the groove-like slot and, by rotating the pin in the stationary mounting block, the inverted T-shaped profile plate holder will move up and down along the side of the die. When the profile plate containing the profile-shaped extrusion apertures is mounted in the holder, the transverse distance between the fastener profile and the extruding film or sheet is varied, permitting the base of the profile to be varied. The total movement in one direction will be twice the offset distance when the pin is rotated a full 360 degrees. This permits the transverse adjustment of the profile die block while the extrusion is occurring to change the longitudinal location of where the profile joins the film, and the size of the profile base, as well as an indirect measurement of the adjustment while the apparatus is operating.

DETAILED DESCRIPTION OF THE DRAWING

Figure 1:
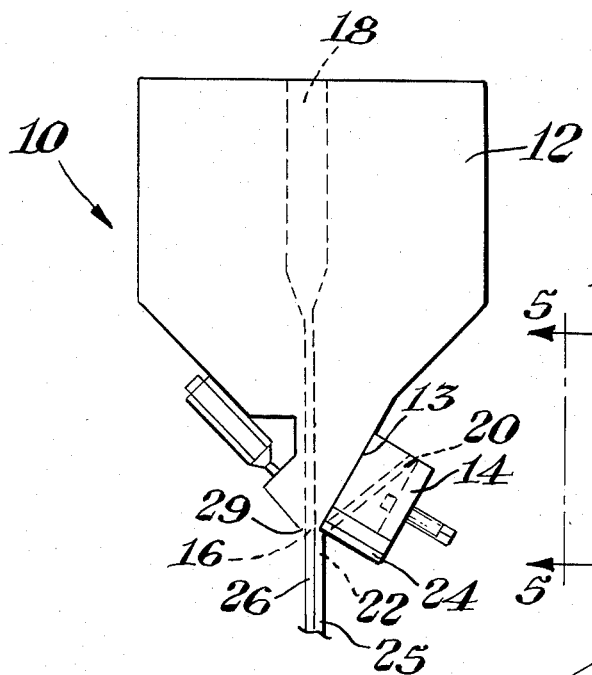
FIG. 1 is a schematic side elevational view of a film or sheet die with a fastener profile die block attached thereto for integrally forming fastener elements on film or sheeting according to the principles of the present invention.
Figure 5:
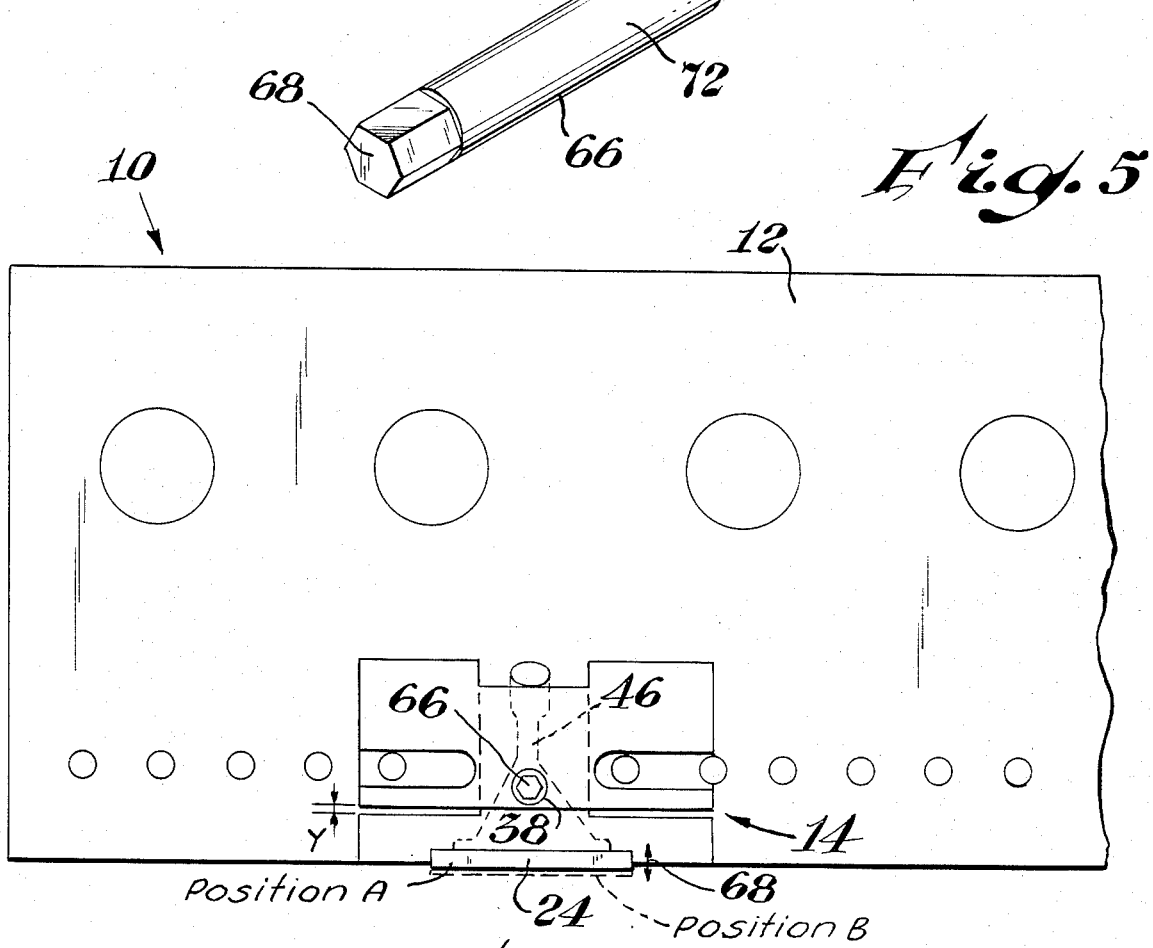
FIG. 5 is a somewhat enlarged front elevational view of a portion of the film or sheet die and profile die block of FIG. 1 looking in the direction of reference line 5—5 of FIG. 1, showing the profile die block of this invention mounted on the film or sheet die in both a Position A and a Position B to affect different profile die gaps.

Apparatus 10 shown in FIGS. 1 and 5 illustrates a film or sheet die 12 (both flexible film or more rigid sheet hereinafter both referred to as "film" for convenience) and attached to the side 13 thereof a fastener profile die block 14 constructed and operated in a manner similar the film die and profile die block of U.S. Pat. No. 4,295,919 except that, in this case, the profile die block 14 is adjustable transversely of the elongated film extrusion slot 16 of die 12. A resin channel 18 feeds the film slot 16 while on resin channel 20 feeds the profile die exit 22, which resin channels 18 and 20 can receive resin from the same or different sources. The main function of profile die block 14 is the mounting, positioning and delivering of thermoplastic polymer to a profile plate 24. The profile plate 24 is positioned in the adjustable profile die block and then mounted on the side 74 of the film die 12. Fastener profile members 25 are extruded through slots 60 and 62 (shown in FIG. 3) in the profile plate 24 onto the hot web 26 from the die 12. Bases produced integrally with the profile members are extruded from gap (later to be described) that exists between the die lips 29 of film die 12 and the profile plate 24. This profile gap is critical so a fine control is required. In the previous profile die block arrangement of U.S. Pat. No. 4,295,919, the gap was set when the extrusion line was shut down. In the present invention, the transversely adjustable feature of the profile die block allows the gap to be changed on-line and permits minute changes in the gap necessary to produce the proper sized base for each profile. Such changes in the size of the profile base can affect profile tipping, size and stability. In addition, the features of this invention permit the die block to be keyed to the film die which keeps the profile plate square to the film die and all adjustments to the gap remain level and even.

Figure 2:
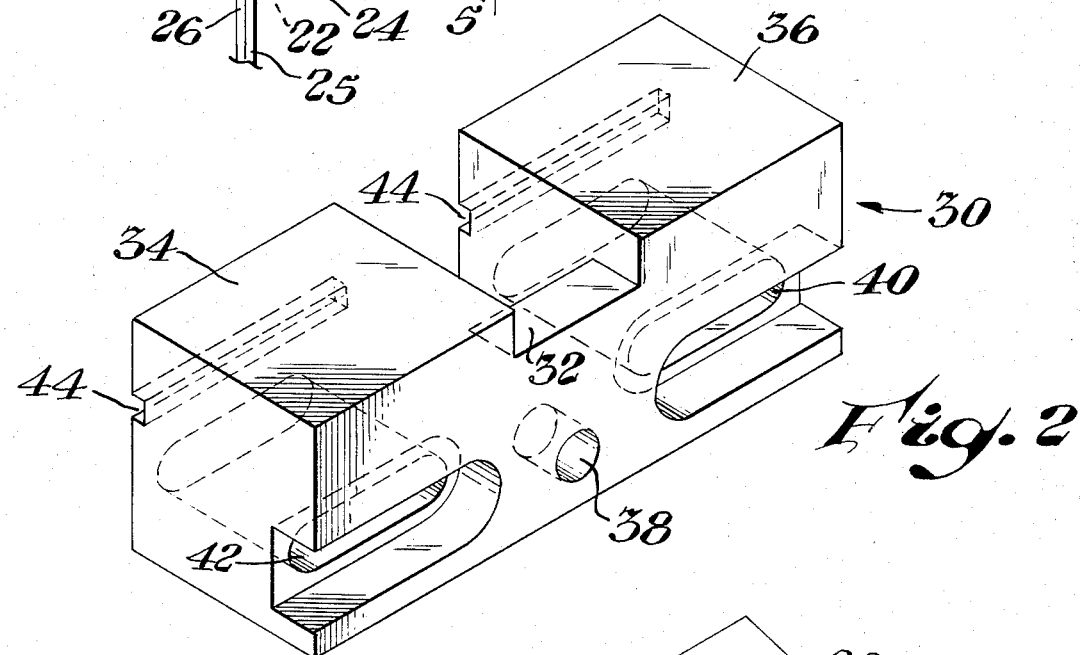
FIG. 2 is an enlarged schematic isometric representation of a U-shaped mounting block forming part of the profile die block of FIG. 1.

As stated previously, the adjustable profile die block 14 consists of three components made from metallic materials. One such component, a generally U-shaped mounting block 30, is shown in FIG. 2. It has a bite portion 32 surrounded by wings 34, 36 to form the general U-shaped channel configuration. Centrally through the bite 32 is located an aperature 38 to receive another of the three components to be later described. Elongated mounting slots 40 and 42 are for receiving fasteners to secure the profile die block 14 to the side 13 of film die 12 adjacent to die lips 29 of the film die 12. A groove-shaped key or slot 44 for receiving another of the components is located along the rear, as shown, of the mounting block 30.

Figure 3A:
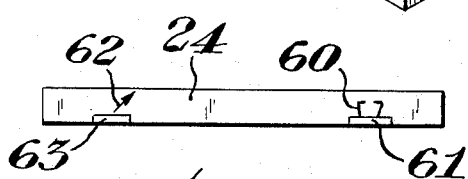
FIG. 3A is an elevational view of the fastener profile plate looking at the rear of FIG. 3.
Figure 3:
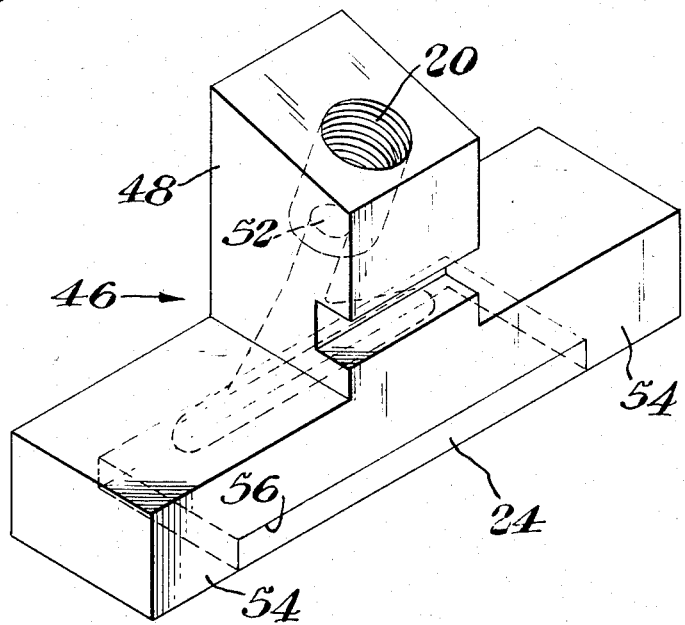
FIG. 3 is an enlarged schematic isometric view showing a T-shaped profile plate holder forming part of the profile die block of FIG. 1, and including a fastener profile plate.

A second component comprising the adjustable profile die block 14 is inverted T-shaped profile plate holder 46 shown in FIG. 3. Stem 48 carries channel 20 which feeds resin from an extruder source, not shown, to die plate 24. The cross arm 54 forming the base of the T has a recess 56 for holding the die plate 24 which contains slots 60 and 62 for forming the profiles 25, as better seen in FIG. 3A. Cut-outs 61 and 63 just below slots 60 and 62 provide for the bases of the profiles. Channel 20 itself is of an inverted T-shape with the transverse portion of the T reaching the slots 60 and 62 and cut-outs 61 and 63 for permitting polymer flow to the profile/base forming parts of plate 24.

Figure 4:
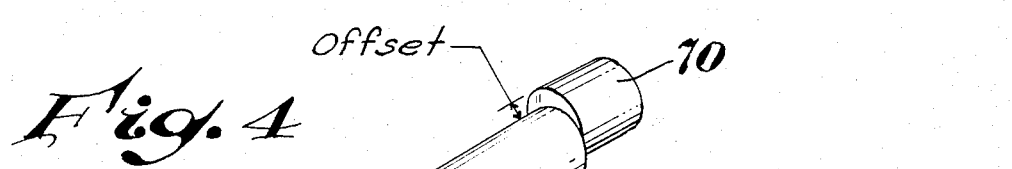
FIG. 4 is an enlarged schematic isometric view of an eccentric adjusting pin forming part of the profile die block of FIG. 1.

The remaining component of adjustable die block 14 is an eccentric adjustment pin 66 shown in FIG. 4. One end of the metal pin 66 is a standard wrench-receiving hexagonal cross-section stem 68, while the other end 70 is circular in cross-section, as is the core 72, which is offset therefrom a predetermined amount to form an eccentric arrangement. The gap X determines the change which will occur in the transverse direction in adjusting the profile die block with respect to the film die 12, as will be obvious later.

FIG. 5 shows the assembly of the components of profile block 14 mounted to the side 74 of the film die 12. The eccentric pin 66 is mounted through aperature 38 of mounting block 30 and engages groove slot 44 of inverted T-shaped profile plate holder 46. As the pin rotates in slot 44 of profile plate holder 46, the die plate 24 is caused to move upwardly and downwardly, as indicated by the arrow 68, from position A shown in solid lines to position B shown in dotted lines in FIG. 5. As is evident, the inverted T-shaped profile plate holder 46 fits into mounting block 30 so that the stem 48 fits in the rectangular U-shaped opening 32 of the mounting block. As the inverted T-shaped holder 46 moves up and down from position A and position B, upon rotation of pin 66, the total movement in one direction will be twice the offset distance when the pin is rotated a full 360 degrees. Because of the design, it is possible to measure the profile gap "X" indirectly from the back of the transversely adjustable die block. A measurement "Y" can be made from the top of the T-shaped plate holder 46 and the bottom of the mounting block 30. Since the movement of the holder 46 is proportional to the profile gap X, a measurement Y can be made indirectly on-line, a possibility heretofore not possible with prior art profile die blocks.

The thickened base of a fastener profile, such as shown as item 50''' in FIG. 7P of U.S. Pat. No. 4,295,919, for example, does contribute to the features of the profile as concerns its tipping, size and stability.

Figure 6:
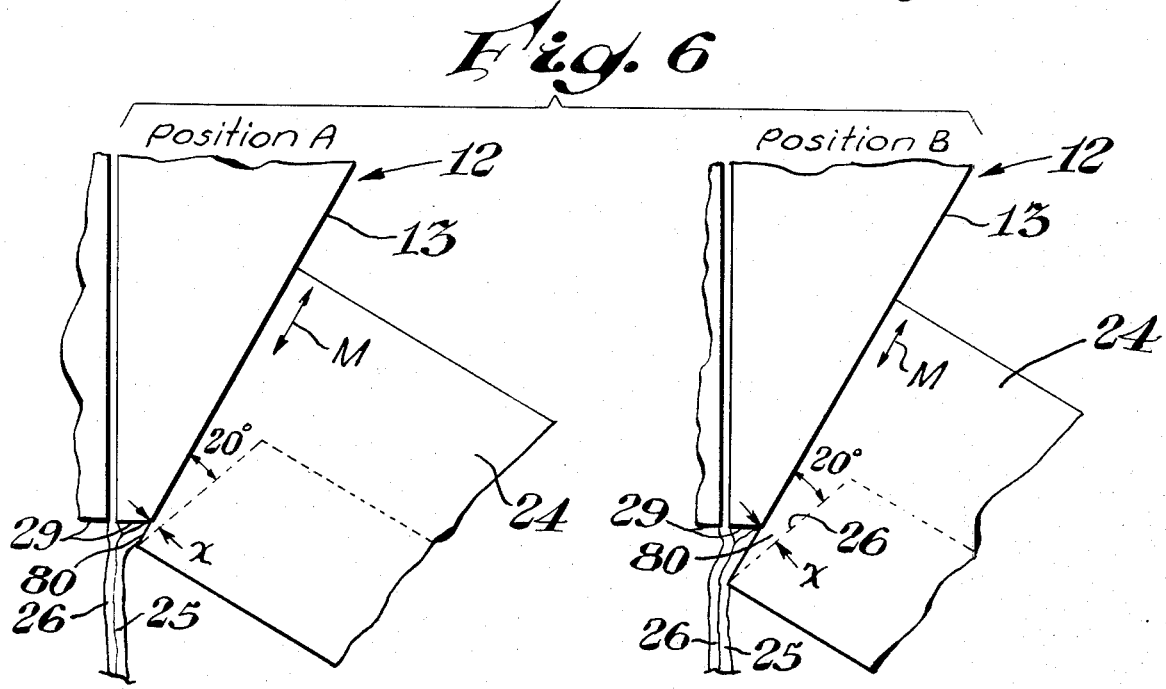
FIG. 6 is a view of the two different die sections showing the varying profile base gaps illustrated for Position A and Position B of FIG. 5.

FIG. 6 is an illustration of how the extrusion orifice or gap 80 (gap X) can change and affect the size of the profile base when there is a change from position A to position B in FIG. 5. For the particular embodiment shown in FIG. 6, there is a 20 degree bevel on the profile plate 24 whereby the profile gap 80 changes to that of gap 80' by movement "M" of holder 46 along side 13 of the die 12 in the direction of the arrow in FIG. 6. The change is calculated by the following equation whereby:

Gap Change $\Delta X =$ (Tangent 20°)$\times$(Movement "M" of the profile plate holder)

In the particular example shown in FIG. 6, for example, the gap change can be equal to the tangent of 20 degrees x a movement M of 0.020 or equal to 0.007 inches. In position B, the gap change can be equal to tangent 20 degrees x a movement M of 0.040 which is equal to 0.014 inches. It can thus be seen that the gap change to position B from position A is approximately double, and visually it can be seen that gap 80' of position B is much greater than gap 80 of position A.

Figure 7:
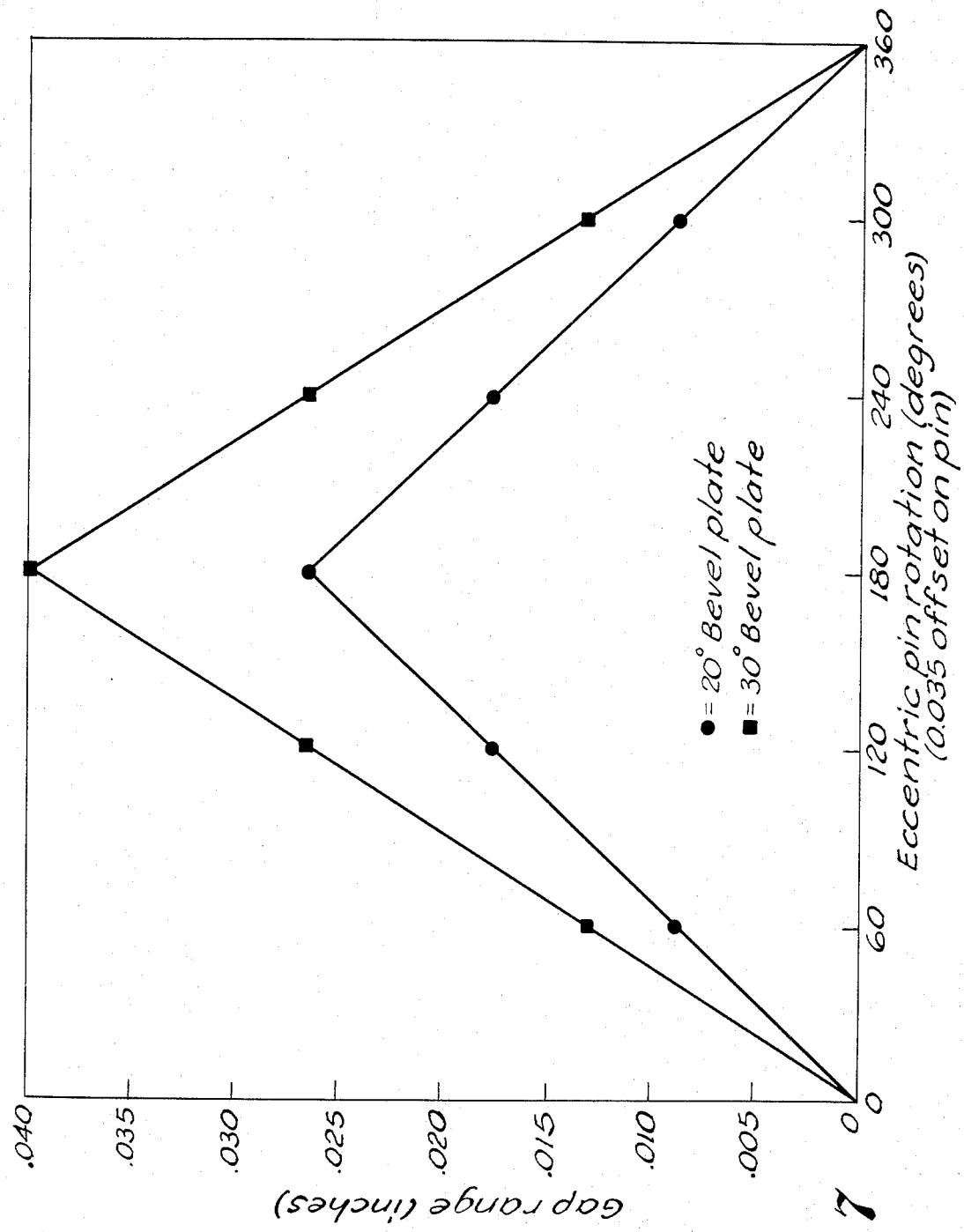
FIG. 7 is a graphical representation of the effect of the rotation of the eccentric pin of the profile die block on profile base gap change, for two different profile die plate bevel situations.

Referring now to FIG. 7, there is shown a graphical representation of gap change as against rotation of the eccentric pin of the die block assembly shown in FIG. 5 to obtain a better illustration of the effect of gap change. In this particular case, the offset of the end 70 from the shaft 72 of eccentric pin 66 was 0.035 inches. It should be appreciated that the principles of this invention can be operable from any position of gap to effect a gap change. In the instance where the eccentric pin 66 is all the way up, i.e., where the eccentric end 70 has no effect on gap, the gap 80 or X is zero. Either way that one would rotate the pin 66 by turning end 68 will result in an opening of the gap. Thus, if the gap is zero, and one were to turn the eccentric pin either direction 60 degrees, the gap would open at about 0.008 inches. But if the gap were already opened 0.010 inches, a 60 degree rotation of pin would then make the gap 0.018 inches. In other words, there is about 0.008 of an inch change in the gap for a 60 degree rotation of the pin in either direction. Of course, a 180 degree rotation will achieve the maximum die gap change. Also illustrated in FIG. 7 is a second embodiment whereby the bevel edge of the profile plate 58 is 30 degrees instead of 20 degrees and, as can be seen, the degree gap change is greater with the greater angularity of the edge 76 of the profile plate 58 with respect to the side 13 of the film die 12.

The present invention makes possible the forming of fastener members, either female- or male- shaped or of any other type or shape, such as ribs, or any other protrusion, whereby the degree of base support for the protrusion is important to the functioning of the protrusion. It can also be applied to multiple extrusion of several protrusions on a film or sheet and is not necessarily limited or restricted to any particular types of resins, films, sheeting or products. The actual design and configuration of a film, sheet, protrusion or product made from the film or sheet or the profile or the protrusion can vary and still remain within the concepts of this invention.

What is claimed is:

1. Apparatus for extruding a protrusion on a film or sheet, said apparatus comprising a film or sheet die with an elongated extrusion slot for extruding said film or sheet, a die block for extruding said protrusion onto said film or sheet, the die block mounted on said die adjacent the extrusion slot of the die, said die block presenting a profile extrusion orifice closely adjacent said extrusion slot and in open communication therewith, said die block comprised of a stationary mounting block, a plate holder, an eccentric pin, and an extrusion plate defining apertures for said protrusion, the die block movable transversely along the surface of said die to enlarge or diminish the extrusion orifice to affect the size and configuration of the base of the protrusion as it engages and joins said film or sheet and the longitudinal location of where the profile joins the film or sheet.

2. The apparatus of claim 1 wherein said mounting block has a U-shaped channel, the plate holder being of an inverted T-shape having a stem engaged with said channel, and the extrusion plate is held by the cross-arm of said holder.

3. The apparatus of claim 2 wherein said pin has an offset and mounted through an aperture in said mounting block and engaging a groove in said plate holder, the opposite end of said pin including means to rotate said eccentric pin, whereupon rotation of the pin causes movement of the plate holder away from or towards the extrusion slot of said die.

* * * * *